Figure 1:
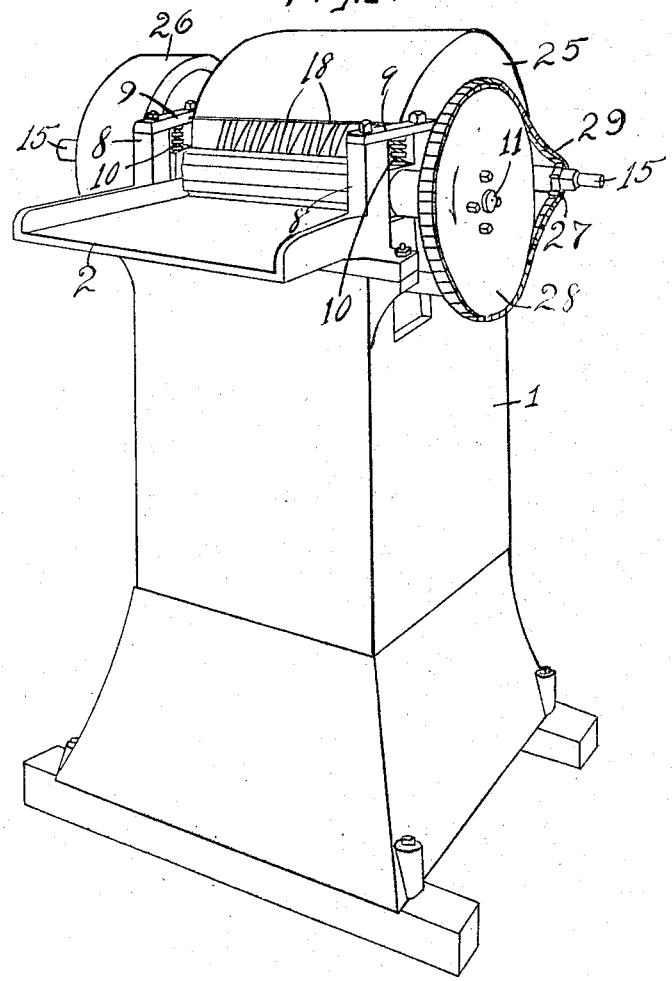

C. D. HELM.
HOT AND COLD COTTON SEED CAKE CUTTER.
APPLICATION FILED JUNE 16, 1916.

1,197,370.

Patented Sept. 5, 1916.
2 SHEETS—SHEET 1.

Inventor,
Clyde D. Helm,
By A. L. Jackson,
Attorney

C. D. HELM.
HOT AND COLD COTTON SEED CAKE CUTTER.
APPLICATION FILED JUNE 16, 1916.
1,197,370.
Patented Sept. 5, 1916.
2 SHEETS—SHEET 2.
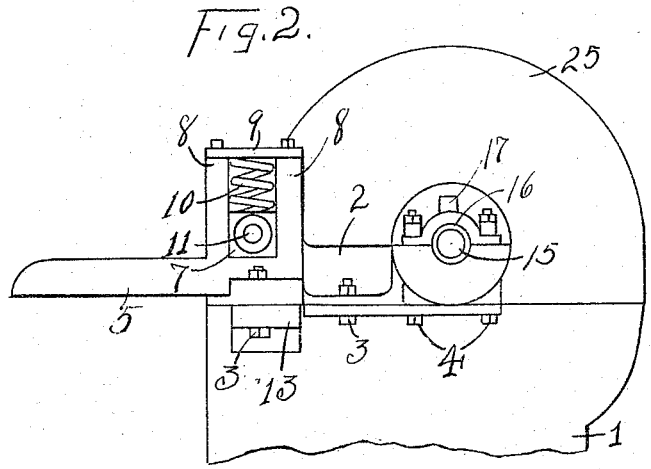
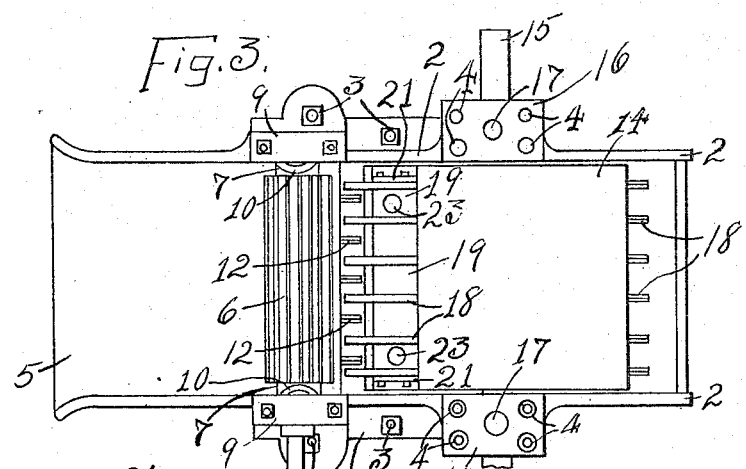
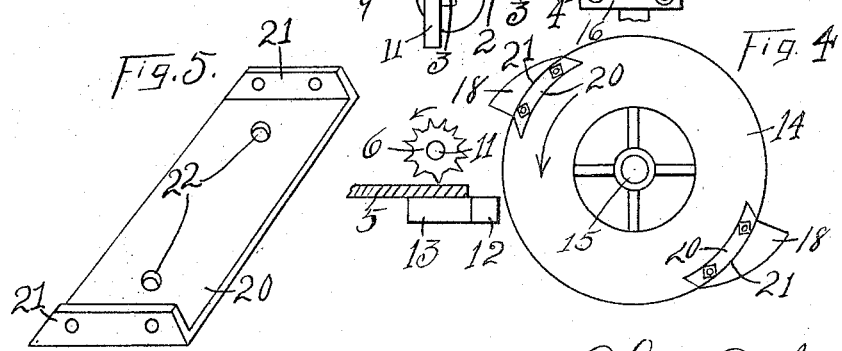
Inventor
Clyde D. Helm,
By A. D. Jackson
Attorney

UNITED STATES PATENT OFFICE.

CLYDE D. HELM, OF FORT WORTH, TEXAS, ASSIGNOR OF ONE-HALF TO W. A. BENNETT, OF FORT WORTH, TEXAS.

HOT AND COLD COTTON-SEED-CAKE CUTTER.

1,197,370.  Specification of Letters Patent.  Patented Sept. 5, 1916.

Application filed June 16, 1916. Serial No. 103,960.

*To all whom it may concern:*

Be it known that I, CLYDE D. HELM, a citizen of the United States, residing at Fort Worth, in the county of Tarrant and State of Texas, have invented certain new and useful Improvements in Hot and Cold Cotton-Seed-Cake Cutters, of which the following is a specification.

My invention relates to machines for cutting pressed cotton seed cake and more particularly to machines for preparing pressed cotton seed cake for stock food; and the object is to provide machines by which the sheets or blocks of cotton seed cake can be cut into small blocks or pieces suitable for feeding stock and which will be efficient in cutting the baked cakes of cotton seed cake without waste so that stock can eat the same without waste and to a machine which will cut the cakes whether hot or cold.

Another object is to prepare machines which are simple in construction and simple in operation and which can be operated by any suitable power and which will be strong and durable. The condition of the baked cotton seed meal cake requires a different machine from such machines as dough dividers and candy cutting machines.

Other objects and advantages will be fully explained in the following description and the invention will be more particularly pointed out in the claim.

Reference is had to the accompanying drawings which form a part of this application.

Figure 1 is a perspective view of the machine. Fig. 2 is a broken side elevation, showing in detail the bearings and the manner of connecting the bearings to the supporting frame of the machine. Fig. 3 is a plan view with the cover and the driving gear removed. Fig. 4 is a detail view, illustrating the cutting blades for cutting the cake in two directions. Fig. 5 is a perspective view of one of the blade holders which is carried by the revolving head.

Similar characters of reference are used to indicate the same parts throughout the several views.

The machine is supported by a box-like structure 1 which constitutes a receptacle for receiving the broken particles of cotton seed meal. A bearing frame 2 is attached to the frame 1 by bolts 3 and 4. The frame 2 has a feeding table 5 integral therewith. The blocks of cake are fed along on the table or chute 5 to a chopping roller 6. The chopping roller 6 is journaled in vertically movable bearings 7 which are held in place by upright arms 8 which are integral with the frame 2. A cross-bar 9 is bolted to the arms or standards 8 to form spring seats for springs 10. The springs 10 bear on the bearings 7 and allow the bearings to yield upwardly to prevent breaking of the machine should there be any obstruction pass under the feeder roller 6. The feeder roller 6 is provided with a shaft 11 which is journaled in the bearings 7. This roller can yield upwardly. The blocks of cotton seed cake are fed along on the chute 5 until the blades of roller 6 can engage the cake. The roller will feed the block of cake along and cut it into longitudinal bars. These bars are discharged onto a series of blades 12 which are horizontally disposed and rigid with a bar 13 which is bolted to the frame 2 rigidly.

Provision is made for cutting the bars of cake deposited on the blades 12. A revolving cylindrical carrier head 14 is mounted rigidly on a shaft 15 which is journaled in bearings 16. The bearings 16 are provided with oil cups 17. Two sets of blades 18 are mounted in the periphery of the carrier 14 which is driven in the direction indicated by the arrow head and the blades 18 strike between the blades 12 and thus cut the longitudinal bars of cake which are lying on the blades 12. There may be as many sets of the blades 18 as may be desirable. The blades 18 have beveled ends to be dovetailed into the periphery of the carrier head 14. The blades 18 may be mounted on plates or trays 20 which have outwardly projecting flanges 21. The blades are set up in the trays 20 with spacing blocks 19 between the blades, the spacing blocks conforming on their outer edges with the curvature of the carrier head so that there is a continuous circle about the carrier head 14. There is an object in this arrangement and that is the bars of meal lying on the blades 12 cannot fall because the blades 12 terminate in close proximity to the surface of the carrier head, the carrier head thus coöperating with the blades 12 to prevent the bars of meal cake from falling. The trays 20 are attached to the carrier head by suitable screw bolts, holes 22 being made in the tray 20 for this purpose and larger holes 23 being made through two of the spacing blocks 19 for the passage of the bolt heads. Rods 24 are run through the flanges 21 and through the blades 18 and the spacing blocks 19 for securing the blades in place. The tray 20 and the blades 18 and the spacing blocks 19 could be made integral. A hood 25 incloses the carrier head 14 and is bolted to the frame 2.

The machine may be driven by a power pulley 26 which is keyed to the shaft 15. A sprocket wheel 27 is rigid with shaft 15 and a sprocket wheel 28 is rigid with shaft 11 and a sprocket chain 29 is used to drive the wheel 28 from shaft 15.

What I claim, is,—

A cake cutting machine comprising a set of stationary blades, a revolving head having its periphery running in close proximity to said blades and having peripheral recesses therein, blades projecting from the periphery of said head and running between said stationary blades, and means for mounting said blades on said head consisting of trays mounted in said recesses, said blades having shanks set in said trays, and spacing blocks set between the blades in said trays, said trays having flanges dovetailed into said recesses and said blocks and said shanks being dovetailed into said recesses, and means for securing said trays to said head.

In testimony whereof, I set my hand this 3rd day of June, 1916.

CLYDE D. HELM.